United States Patent [19]
Podd

[11] Patent Number: 5,553,980
[45] Date of Patent: Sep. 10, 1996

[54] SELF PROPELLED DISCHARGE MECHANISM FOR CONTAINER LINER

[76] Inventor: Victor I. Podd, 2582 NW. 59th St., Boca Raton, Fla. 33496

[21] Appl. No.: 297,253

[22] Filed: Aug. 26, 1994

[51] Int. Cl.⁶ .................................................. B65G 53/26
[52] U.S. Cl. .............................. 406/38; 406/113; 406/152
[58] Field of Search ............................. 406/38, 39, 113, 406/115, 151, 152, 153

[56] References Cited

U.S. PATENT DOCUMENTS

| | | | |
|---|---|---|---|
| 289,315 | 11/1883 | Smith | 406/152 |
| 646,490 | 4/1900 | Deery | 406/151 |
| 1,754,507 | 4/1930 | Frohm | 406/115 |
| 2,301,617 | 11/1942 | Cox et al. | 406/152 |
| 2,712,797 | 7/1955 | Woehrle et al. | 105/367 |
| 2,931,523 | 4/1960 | Nelligan | 214/82 |
| 2,970,865 | 2/1961 | Finnegan | 406/152 |
| 3,179,472 | 4/1965 | Lenhart | 406/152 |
| 3,731,828 | 5/1973 | Clarke et al. | 214/305 |
| 3,758,163 | 9/1973 | Kalisiak | 406/152 |
| 3,876,260 | 4/1975 | Moss et al. | 406/115 |
| 3,978,996 | 9/1976 | Oltrogge | 214/17 D |
| 3,994,532 | 11/1976 | Hahn | 406/115 |
| 4,973,203 | 11/1990 | Oftedal | 406/113 |
| 5,024,346 | 6/1991 | Roser | 220/401 |
| 5,139,102 | 8/1992 | Pocapalia | 280/DIG. 11 |
| 5,322,393 | 6/1994 | Lundquist | 406/151 |

FOREIGN PATENT DOCUMENTS

| | | | |
|---|---|---|---|
| 235126 | 10/1987 | Japan | 406/153 |

*Primary Examiner*—Gary C. Hoge
*Attorney, Agent, or Firm*—John C. Smith

[57] ABSTRACT

A mobile cargo discharge device which moves across the floor of a container, pulling cargo under vacuum pressure into a discharge opening in the front of the device and outputting cargo into a conventional discharge conduit such as a pneumatic or screw conveying device. The device may also have a fluidizing mechanism on the forward wall which disturbs the cargo and enhances cargo flow through the discharge opening. The fluidizing mechanism is implemented through vibration or through jet streams of air emitted from the forward wall of the device. The device can be used in containers with or without liners.

3 Claims, 14 Drawing Sheets

Prior Art

SELF PROPELLED DISCHARGE MECHANISM FOR CONTAINER LINER

BACKGROUND OF THE INVENTION

1. Technical Field

The present invention relates to the loading and unloading of flowable cargo transported in lined or unlined bulk cargo containers. In particular, it relates to mobile discharge devices which unload containers on level surfaces by moving through the container under power and discharging cargo without having to raise the container.

2. Background Art

Transportation of containers for bulk commodity products (grains, etc) have been implemented using a variety transport vehicles, such as trucks, railroads, and ships. An important economic factor in the transportation of bulk commodities is the speed and ease with which the commodities are loaded onto and unloaded from the container.

Typical methods of loading and unloading tank type containers are pressure systems such as pumps to force commodities into the container during loading and to provide suction to remove the commodities during unloading. Another popular method is the use of gravity mechanisms. For example, gravity may be used to unload a dry box ISO container by tilting the container such that the bulk commodity flows toward a discharge door at the rear end of the container.

The prior art approach of raising the container to allow the bulk commodity to flow out has been effectively used to unload cargo from the container with a minimum amount of labor cost. With this method, there is some additional labor expense of manually removing the residual commodity trapped in the corners. In addition to the labor expense required to remove the residual commodity product from the corners, the economic efficiency of the container and transport vehicle is reduced due to the delay involved with this additional step in the unloading procedure. More important, the capital or rental cost of the mechanism required to lift the weight of the container for tilting purposes is high, and also raises safety problems inherent in any machinery of that size. Further, due to its cost, this type of unloading device is not always available. In the case where bulk commodity is infrequently delivered, this type of unloading solution may not be available or economically feasible.

Another prior art approach which addresses the foregoing problem is to unload the cargo by having an individual manually control a suction hose, and walk through the container to unload the contents. This solution allows unloading the cargo in locations where tilt mechanisms are unavailable. However, it also entails several drawbacks. It is very labor intensive, and due to the weight involved, must be done at a speed which allows an individual to safely unload the container contents. In turn, this increases unloading time and reduces economic efficiency. In addition, it requires that the individual enter the container which exposes products to contamination by the worker, and depending on the cargo, exposes the worker to contamination as well.

A third alternative is to unload the commodity using a vehicle such as a small front loader which can be driven into the container. This method is quicker than the manual method discussed above, but is much costlier due to the cost of the front loader. In addition, the likelihood of contamination of the cargo is an inherent drawback. The labor costs may also be higher since the front loader operator may be better paid than the manual laborer discussed above.

Depending on the commodity, the front loader solution may not be usable for all types of cargo. In addition, the front loader is an expensive item of equipment which may not be available at a given location just as the tilt mechanism may not be available.

While addressing the various aspects of unloading bulk commodities in container systems, the prior art has typically chosen alternative methods such as the tilt systems or manual systems discussed above. While tilt systems can rapidly unload, they have numerous drawbacks such as high cost, non-universal availability, and safety concerns. On the other hand, manual systems are slower to unload, have a potentially high contamination risk, and are less efficient than tilt systems. Front loaders are also less efficient than tilt systems, but retain the aspect of high cost. The prior art has not provided an unloading system which is universally available, does not have the high cost of tilt systems and front loaders, or the economic inefficiency of manual systems, reduces worker exposure to physical injury, reduces worker exposure to contamination by the cargo, and cargo exposure to contamination by the worker.

SUMMARY OF THE INVENTION

The present invention solves the foregoing problems by providing a portable mobile cargo discharge mechanism which unloads bulk cargo from a container without requiring a tilt mechanism. The discharge mechanism includes a fluidizer to enhance product flow by preventing settling of the cargo near an intake port on the discharge mechanism. The fluidizer uses an air jet system or an optional vibrator system. The discharge mechanism is powered to move about the container floor under control of an operator who can control the unit from inside the container or from outside the container. Containers with or without liners can be unloaded by the discharge mechanism.

DESCRIPTION OF THE PREFERRED EMBODIMENT

Figure 1:
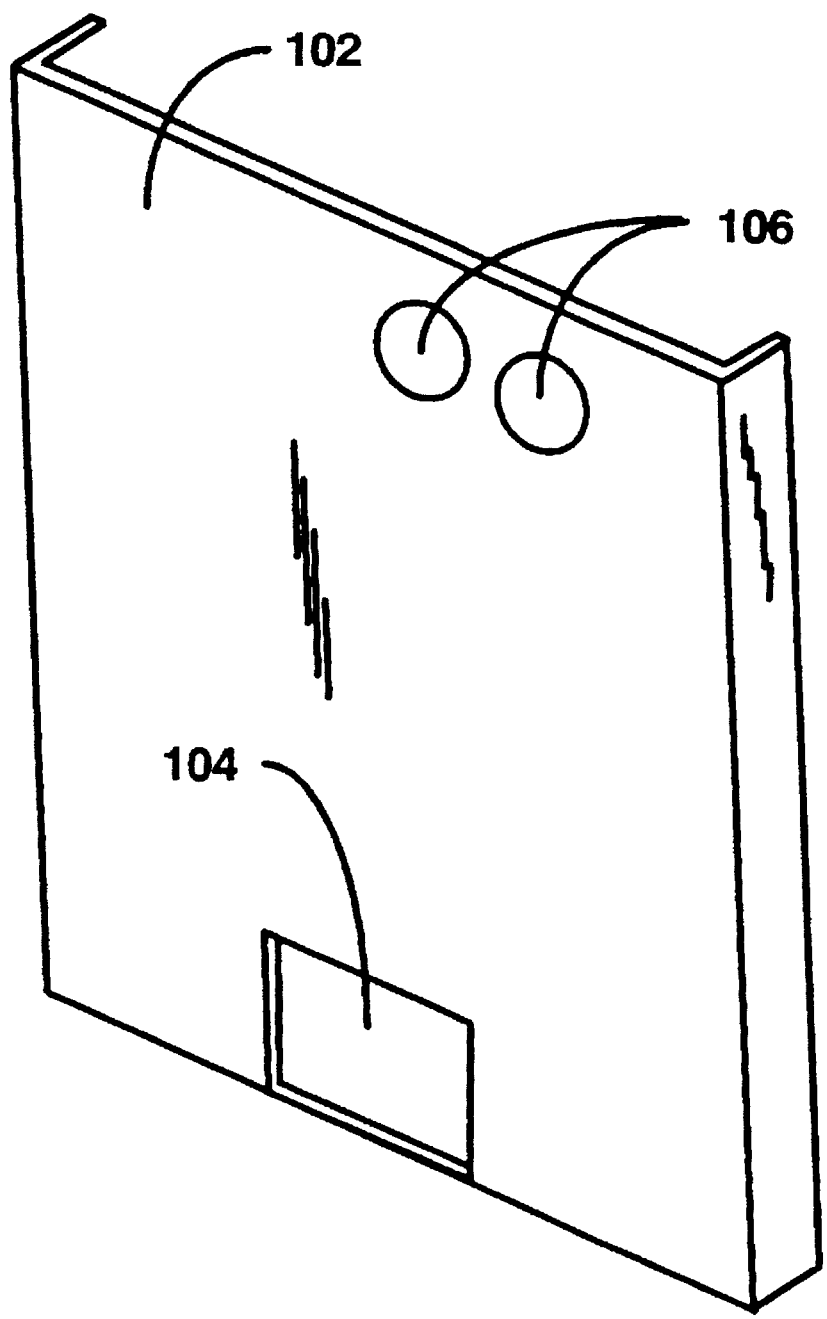
FIG. 1 is a diagram of a prior art bulkhead.

Referring to FIG. 1, this figure shows a prior art bulkhead used by tilt systems. Bulkhead 102 has discharge door 104 located at its base to allow discharge of cargo from the base of the container as it is being tilted. During loading, discharge door 104 is sealed and load/vent holes 106 located near the top of the bulkhead 102 are used to provide access for loading the cargo.

Figure 2:
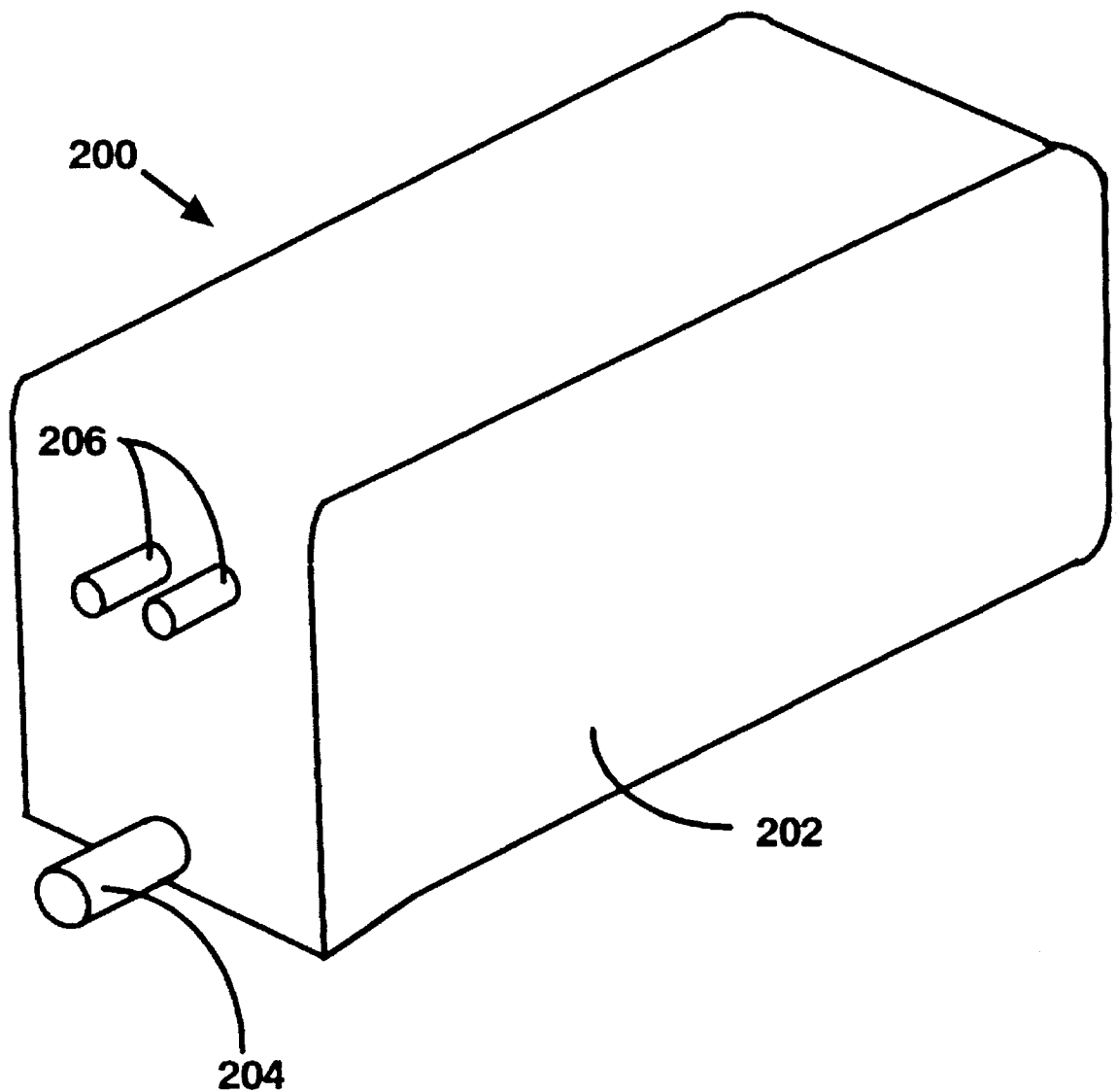
FIG. 2 is a diagram of a prior art liner.

FIG. 2 shows a prior art liner 200 which can be used in conjunction with bulkhead 102. Tubes 206 provide access to load/vent liner 202. Discharge tube 204 is located to fit through discharge door 104.

Figure 3:
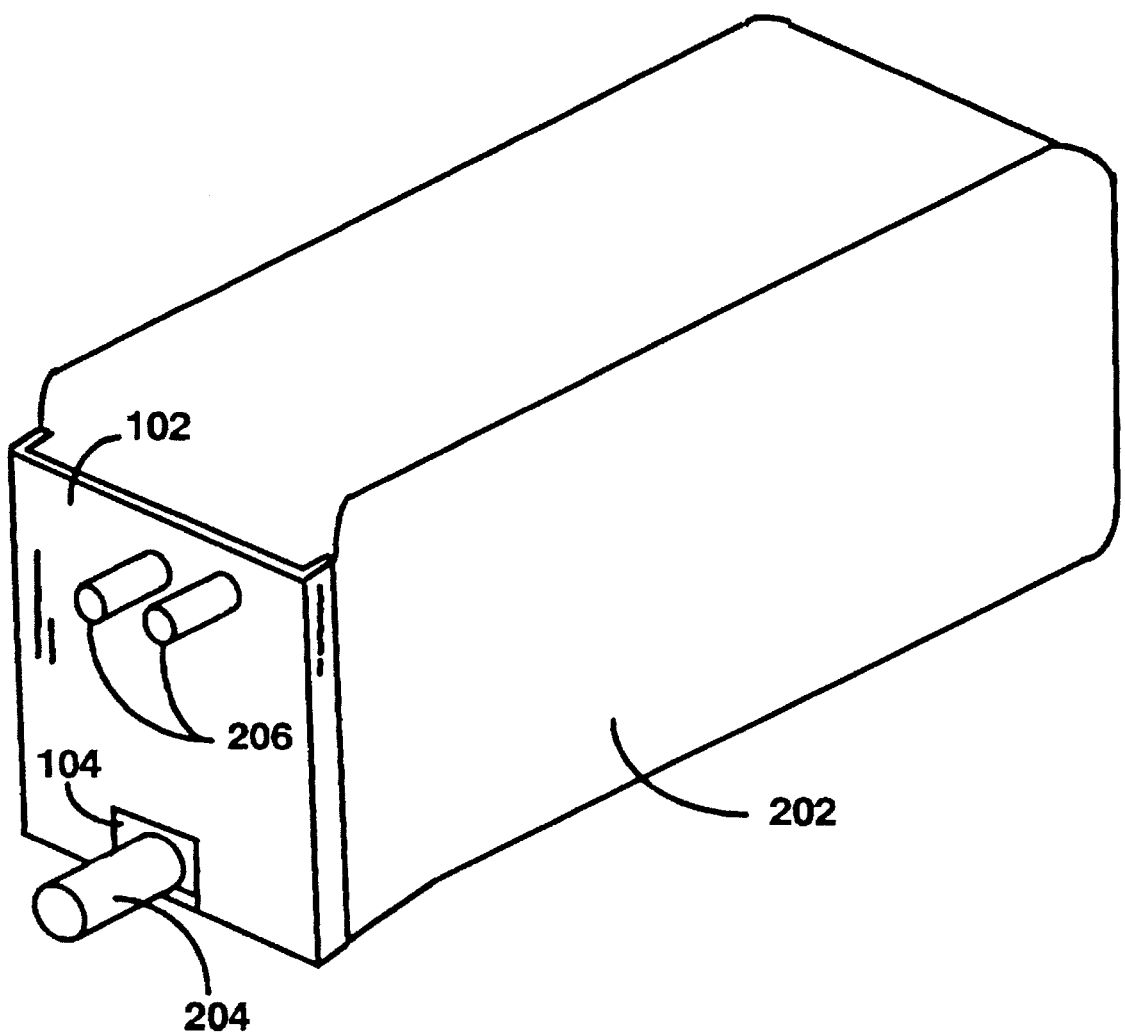
FIG. 3 is a diagram of a prior art liner and integral bulkhead.

FIG. 3 is another prior art configuration showing bulkhead 102 and liner 200 integrated into a single unit.

Figure 4:
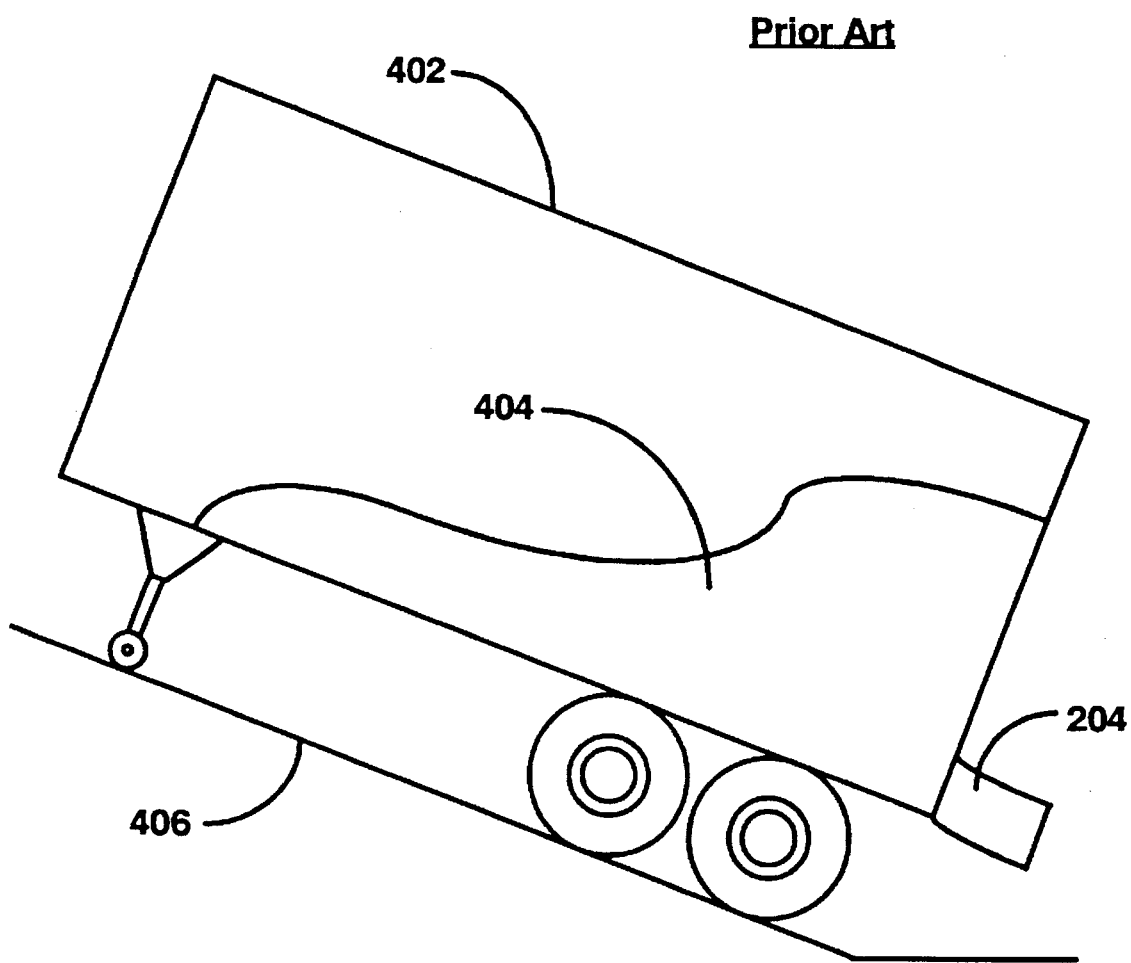
FIG. 4 is a diagram of a prior art unloading method.

FIG. 4 illustrates a prior art method of using the devices of FIGS. 1 through 3 to unload bulk cargo 404 with a tilt mechanism 406. Tilt mechanisms 406 can be used with or without liners 200. A container 402 is driven onto a tilt mechanism 406 and raised to allow gravity to unload the bulk cargo 404 through discharge tube 204. Those skilled in the art will recognize that container 402 can be a conventional trailer or an ISO container. For ease of illustration, container 402 is shown as a conventional trailer in FIG. 4. Due to the substantial weight of a typical container 402, tilt mechanisms 406 are expensive devices. As a result, they are not available at all locations which service containers 402. In the event a particular location does not ordinarily handle bulk commodities, an infrequent delivery of such goods will often require another unloading method. Alternative methods will either be the slower and less efficient use of a front loader or the even more inefficient use of a manual vacuum system.

Figure 5:
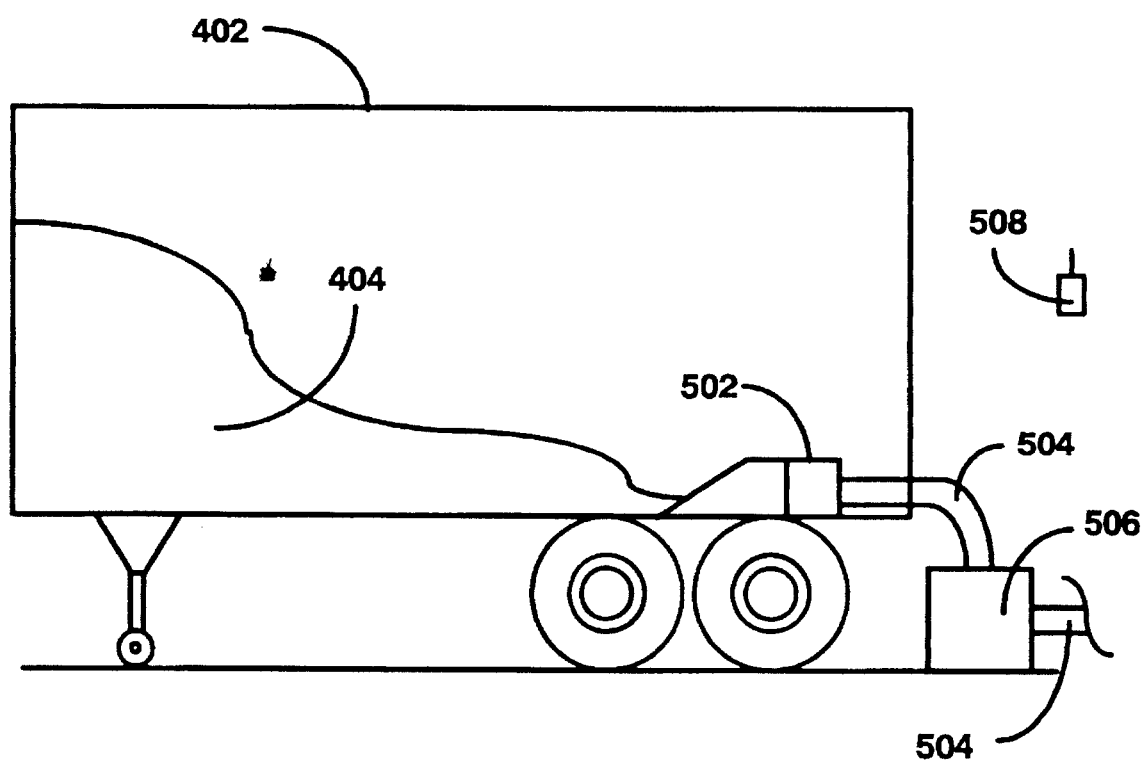
FIG. 5 is a diagram of the unloading method of the present invention showing the mobile discharge device.

FIG. 5, which shows a preferred embodiment of the invention, is a side cutaway view showing the cargo 404 in container 402 being unloaded by a mobile cargo discharge mechanism 502. For ease of illustration, a liner is not shown since the use of a liner is determined by the nature of the cargo, and not the use of a discharge mechanism 502. The cargo 404 enters the front of discharge mechanism 502 under vacuum pressure supplied by pump 506 through conduit 504. The cargo 404 is pumped through conduit 504 to its unloading destination (not shown). For ease of illustration, pump 506 is shown as a separate unit, but those skilled in the art will recognize that it can also be integrated with mobile discharge mechanism 502. The discharge mechanism 502 moves through the container 402 under control of an operator as it unloads cargo 404 until container 402 is empty.

Those skilled in the art will recognize that a variety of control systems are available which would be suitable for controlling the direction and speed of discharge unit 502. For example, direct mechanical controls (not shown) could be used for instances where an operator was to climb into container 402 and steer discharge mechanism 502 through container 402. Likewise, remote control through wiring (not shown) or through a radio controller 508 are both possible. The remote control alternatives allow an operator to remain outside of container 402 during unloading which avoids contamination of cargo 404 by the operator and contamination of the operator by a particular type of cargo 404.

The discharge mechanism 502 has the advantage of allowing container 402 to be unloaded on a level surface which eliminates the need for an expensive tilt mechanism. Likewise, since the discharge mechanism is powered (a more detailed discussion of the control and drive aspects of discharge mechanism 502 follows in the discussion of FIGS. 11–14), it can more rapidly and efficiently unload cargo than an individual can using a vacuum system. Further, the discharge mechanism 502 has a number of advantages over a front loader (not shown). It is less expensive than a front loader. The labor costs are less because a front loader operator must have the appropriate skills and license to operate a front loader while the discharge mechanism 502 can be operated by anyone. In addition, a front loader may not be readily available at a particular delivery location, while discharge mechanism 502 can be carried on the container and is also less expensive so that it can be more readily purchased for a given location.

Figure 6:
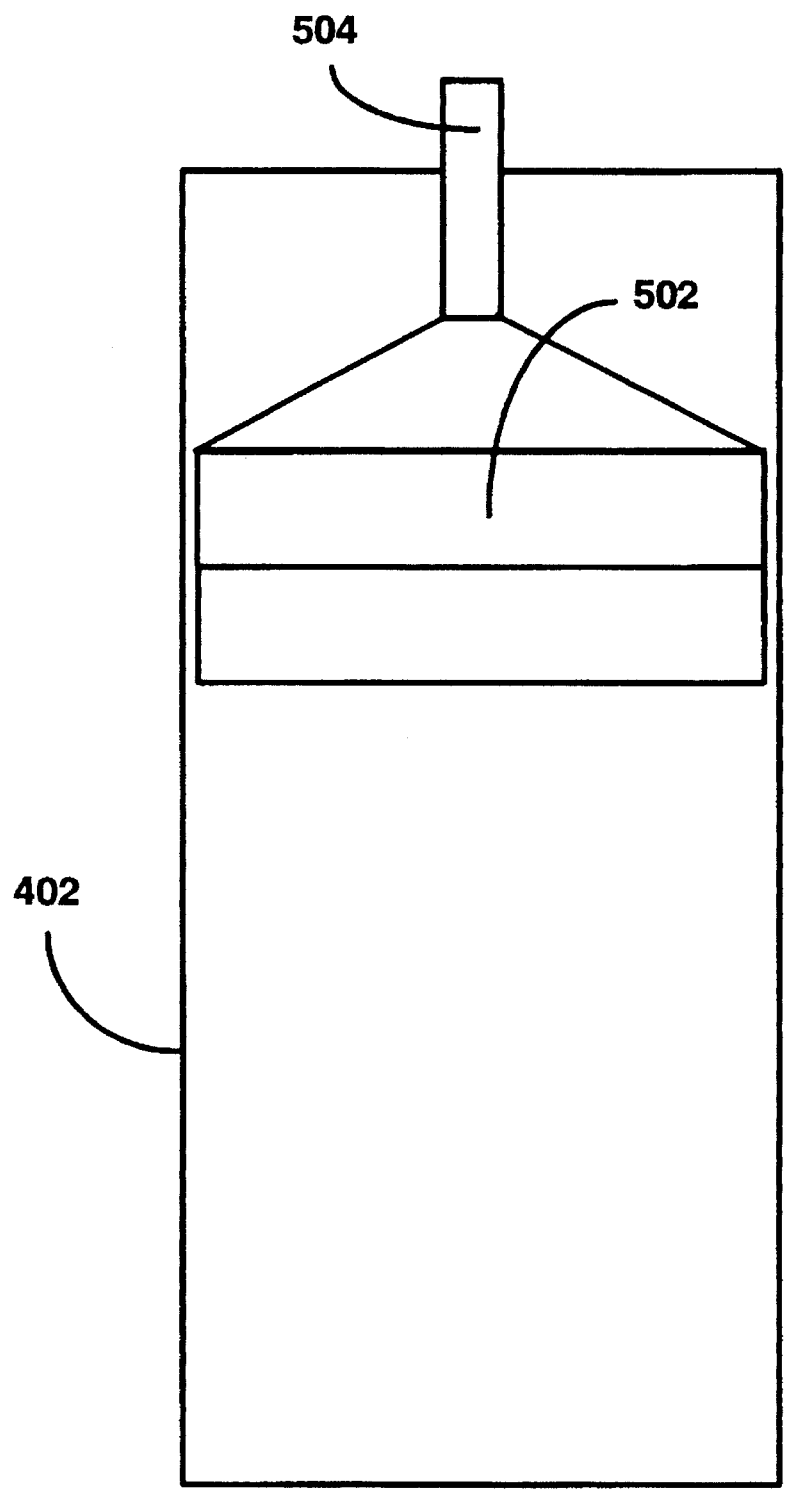
FIG. 6 is a top view of the mobile discharge device in a container.

FIG. 6 shows a top view of discharge mechanism 502 in container 402. While shown as extending across the width of container 402, those skilled in the art will recognize that discharge mechanism 502 can in fact be much smaller than the width of container 502. In practice, the air pressure provided by pump 506 and the unit weight of cargo 404 will determine the most suitable size for discharge mechanism 502.

Figure 7:
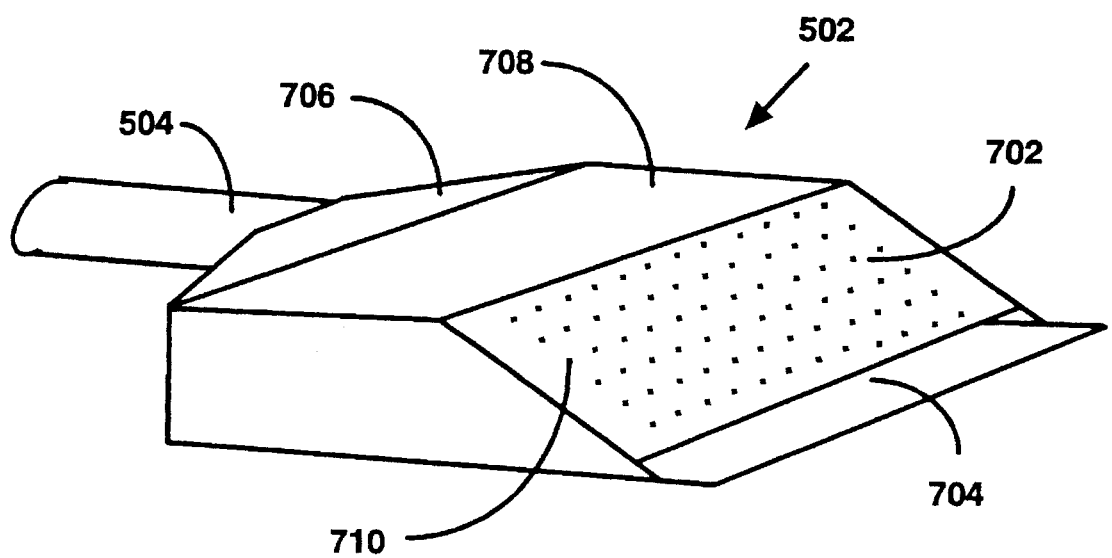
FIG. 7 is a detailed view of the discharge device.

FIG. 7 shows a perspective view of discharge mechanism 502 which illustrates in more detail several features of the preferred embodiment. The forward wall of discharge mechanism 502 includes input aperture 704 which is the intake port for cargo 404 (shown in FIG. 4) pulled into discharge mechanism 502. While fluidization panel 702 can be oriented in a vertical direction, the preferred embodiment uses a sloped angle to facilitate movement of the discharge mechanism 502 into cargo 404. In addition, by placing fluidization panel 702 above input aperture 704, the settling of cargo 404 is reduced and the movement of cargo 404 into input aperture 704 is enhanced. A more detailed discussion of the operation of fluidization panel 702 is made below in the discussion of FIGS. 8 through 10. Perforations 710 are provided on fluidization panel 702 to provide an airflow path for the fluidizing air jets.

Behind the forward wall of discharge mechanism 502 is top shelf 708 and rear funnel section 706. Rear funnel section 706 is designed to facilitate movement of cargo 404 to the exit port (not shown). Those skilled in the art will recognize that discharge mechanism 502 can be designed without the section enclosed by top shelf 708 and without rear funnel section 706. The size selected will be based on the type of commodity to be unloaded, the type of drive mechanism selected, and other considerations such as whether the discharge mechanism is to be stored in the container or at the delivery site.

Figure 8:
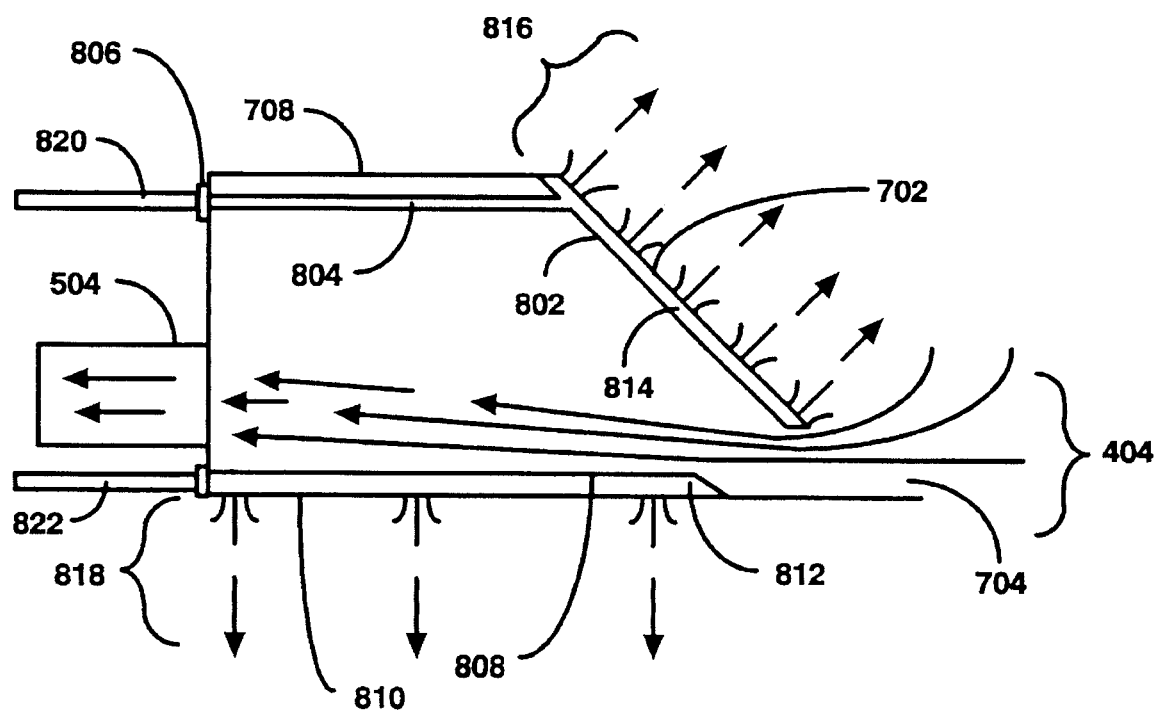
FIG. 8 is a cutaway side view of the discharge device showing an air jet fluidization panel plus a levitation device.

FIG. 8 shows a side cutaway view of discharge mechanism 502. In this embodiment, high pressure air is supplied to air input 806 by flexible hoses 820, travels through air conduit 804 into chamber 814. Internal wall 802 of chamber 814 is sealed. The external wall of chamber 814 is formed by fluidization panel 702. Fluidization panel 702 contains a plurality of small apertures which allow air jets 816 to be emitted through fluidization panel 702 into cargo 404. Air jets used to form a wall of air are well known in the arts and exemplified by devices such as air hockey tables. Those skilled in the art will recognize that the apertures must be both small enough provide high speed air jets and also small enough to prevent cargo 404 from falling into chamber 814 and obstructing airflow. Fluidization panel 702 can be constructed with a variety of materials. For example, it can be constructed from screen, wire mesh, fabric, plastic, or metal. Likewise, it is understood that chamber 814 can easily be constructed such that it can be opened to periodically clean chamber 814.

Discharge mechanism 502 is driven into cargo 404 and draws cargo 404 into input aperture 704. In addition, while air jets 816 are disturbing cargo 404, the particles of cargo disturbed by the air jets slide down to input aperture 704, thereby enhancing cargo flow into discharge mechanism 502. Pump 506 provides air pressure which pulls cargo 404 into input aperture 704 and out through conduit 810.

In this embodiment, the floor 808 of discharge mechanism 502 is shown as raised to allow room for a levitation mechanism which can in turn be shielded from the cargo by extending the side panel 810 of discharge mechanism 502 to the floor. Flexible hose 822 provides pressured air which is expelled as air jets 818. Air jets 818 form an air cushion which acts as a levitation device. Those skilled in the art will also recognize that the levitation device can also be located outside of discharge mechanism 502 such that the floor 808 of discharge mechanism 502 is located at the same level as lower edge 810 of discharge mechanism 502.

Figure 9:
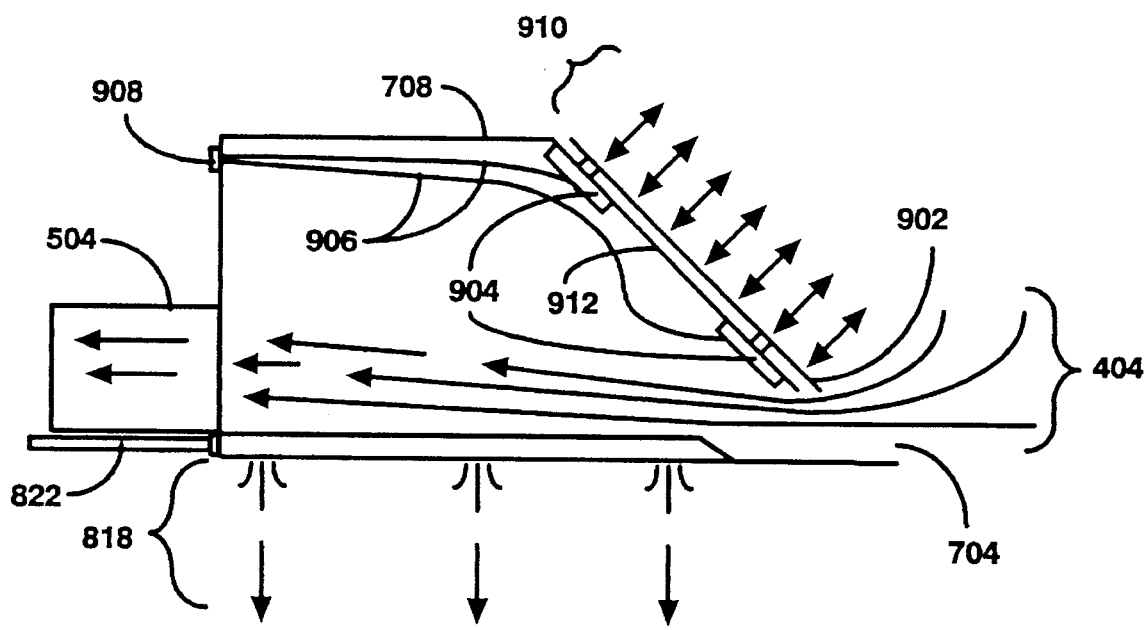
FIG. 9 is a cutaway side view of the discharge device showing an alternative embodiment using a vibration fluidization panel plus a levitation device.

FIG. 9 shows an alternative embodiment in which fluidization is accomplished by a vibrating panel 902 which is secured to forward wall 912. Vibration generator 904 creates vibrations 910 in vibrating panel 902 which create a disturbance in the cargo 404 and enhance cargo flow to input aperture 704 similar to that discussed in relation to FIG. 8, above. In this illustration, vibration generators 904 are shown as electrical devices powered by electricity input to electrical connector 908 and electrical wires 906. Those skilled in the arts will recognize that a variety of devices can be used to generate vibration in addition to electrical devices. For example, air pressure or pneumatic powered devices can also be used.

Figure 10:
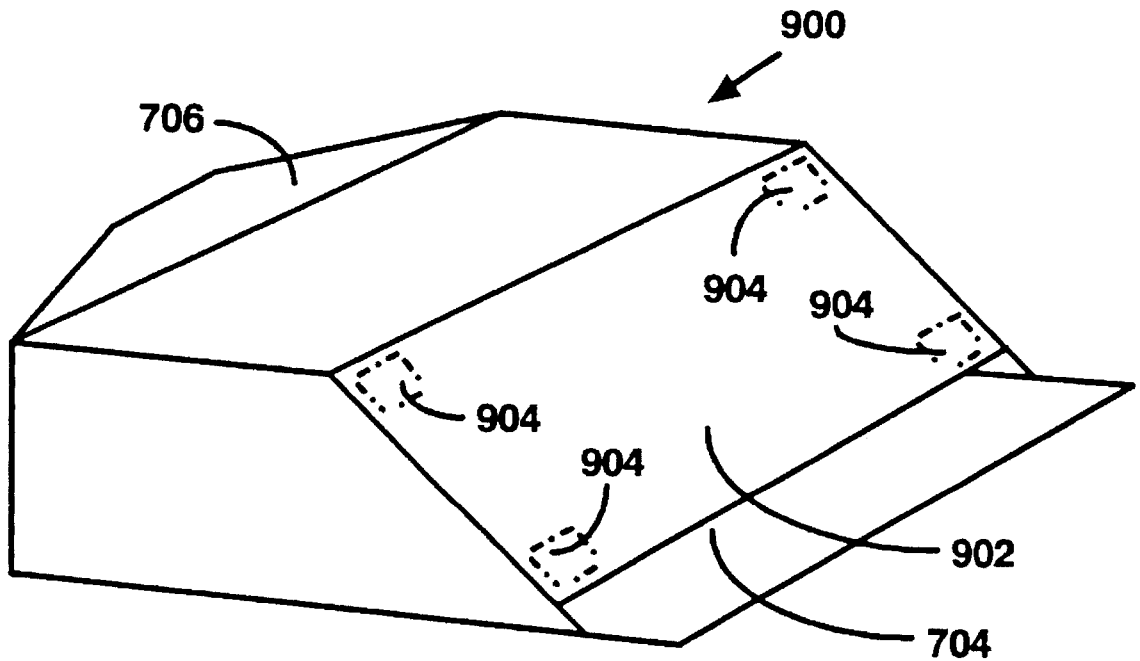
FIG. 10 is a diagram showing the location of the vibrators in the discharge device of FIG. 9.

FIG. 10 illustrates the placement of four vibration devices 904 at corners of vibrating panel 902. Of course, the number and placement of vibrating devices is a design choice which can vary based on type of cargo, and cost constraints.

Figure 11:
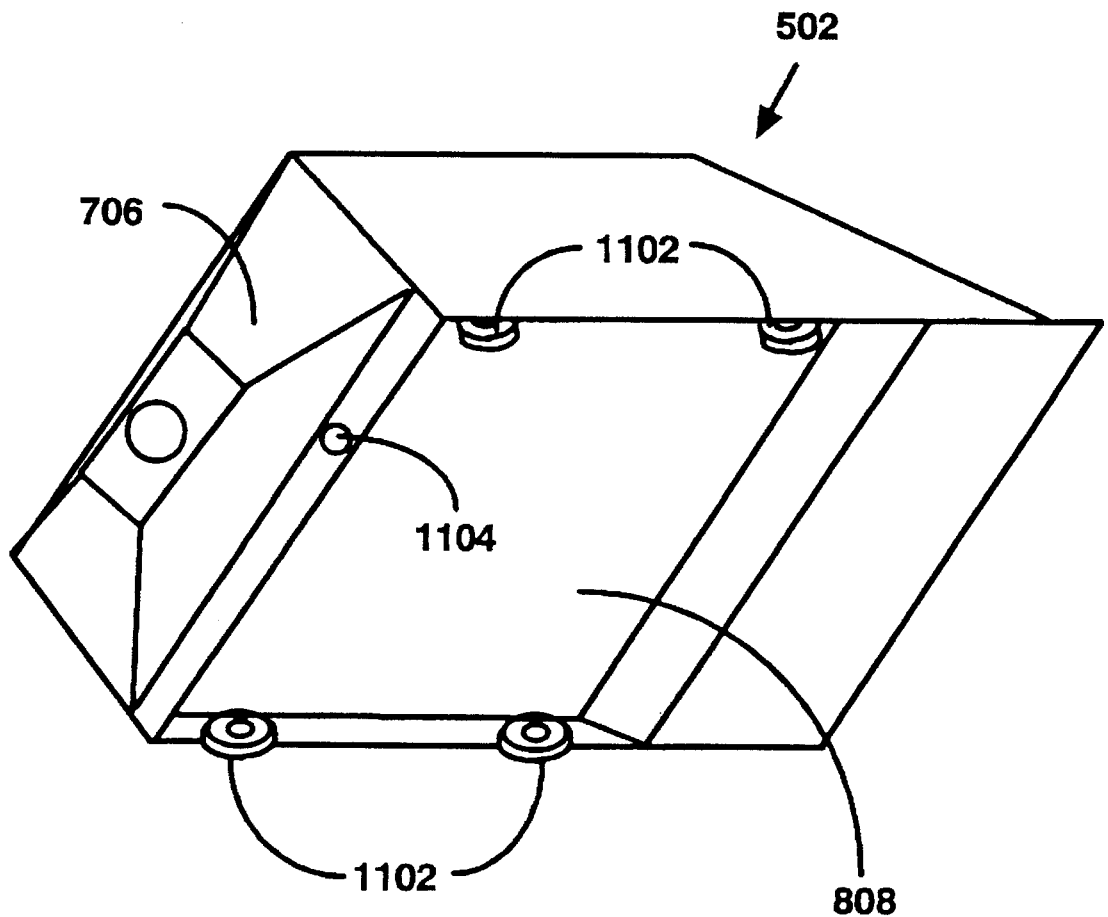
FIG. 11 is a diagram showing a bottom rear view of the device with the discharge port and roller wheels.

FIG. 11 shows the location of wheels 1102 in the preferred embodiment. As can be seen, wheels 1102 are located below the floor 808 of discharge mechanism 502 to isolate wheels 1102 from cargo 404 flowing through discharge mechanism 502. Port 1104 provides access for driver 1206, shown in FIG. 12.

Figure 12:
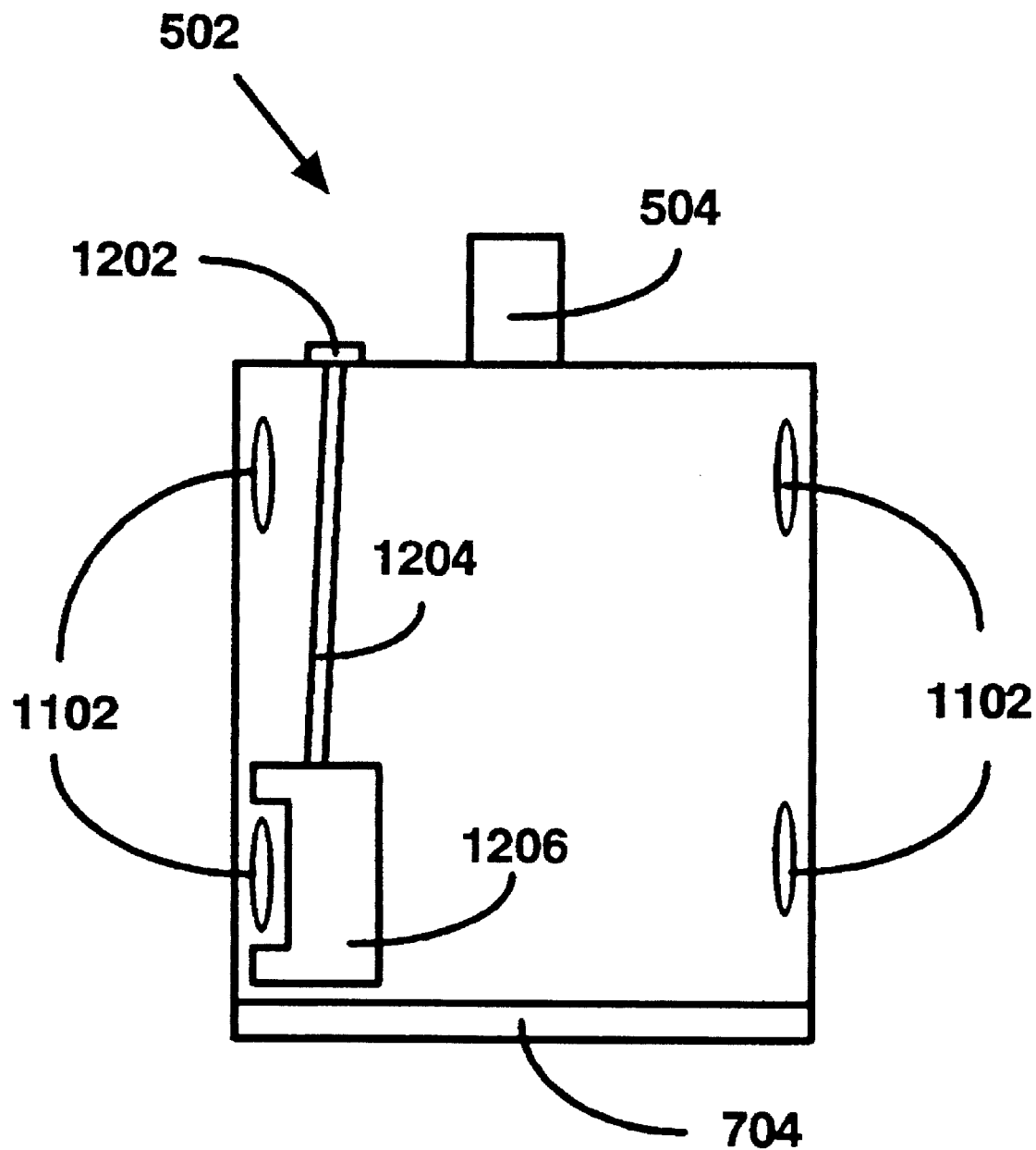
FIG. 12 shows a propulsion mechanism arranged to drive the roller wheels.

FIG. 12 shows an embodiment in which an electric power driver 1206 is attached to wheel 1206. Power is provided through conduit 1204 from connection 1202. Those skilled in the art will recognize that alternative embodiments can easily be implemented which use a variety of power sources, such as air pressure, internal combustion, etc. Likewise, the steering mechanism has been omitted for ease of illustration. Steering mechanisms are well known in the art and can be accomplished by a variety of methods, such as direct mechanical control, direct or remote wiring with servo systems, remote radio control, etc.

Figure 13A:
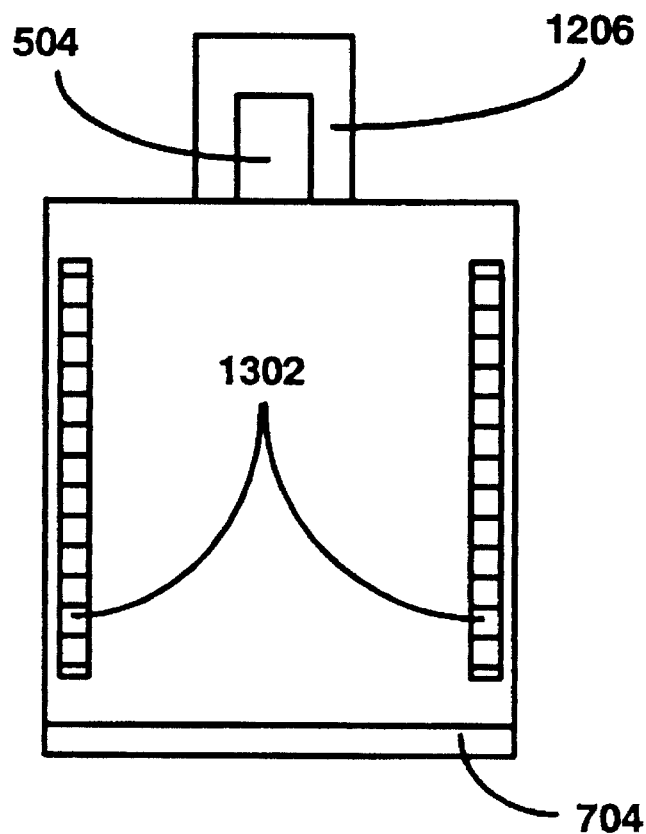
FIGS. 13A and 13B show an alternative propulsion mechanism using a tractor drive.
Figure 13B:
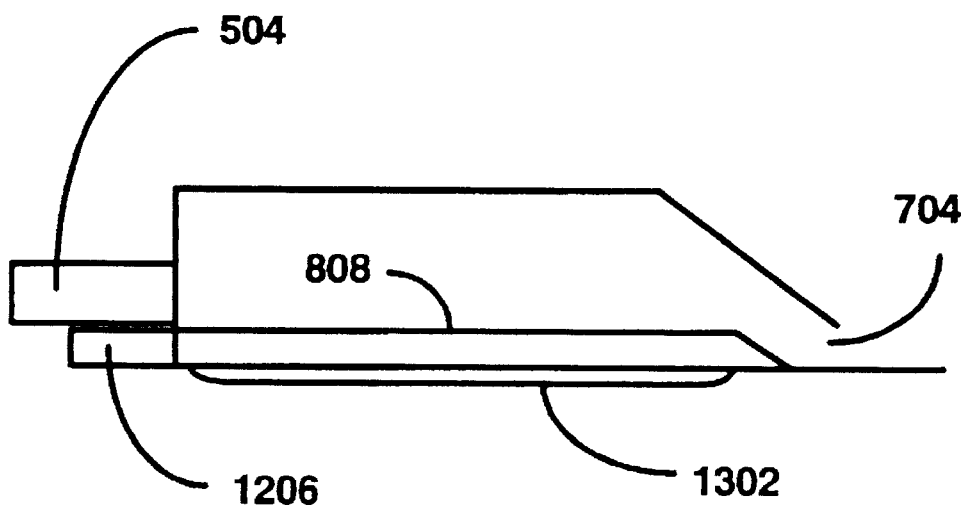

FIGS. 13A and 13B show an alternative embodiment in which a tractor drive 1302 is used. In addition, driver 1206 is attached to the outside of discharge mechanism 502.

Figure 14A:
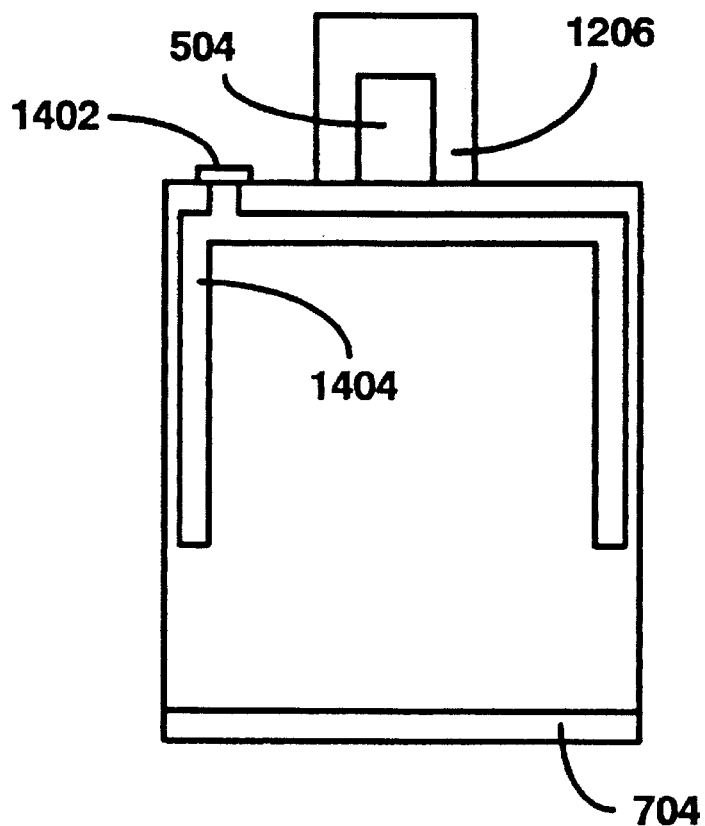
FIGS. 14A and 14B show an alternative propulsion mechanism using an air cushion drive (a levitation device).
Figure 14B:
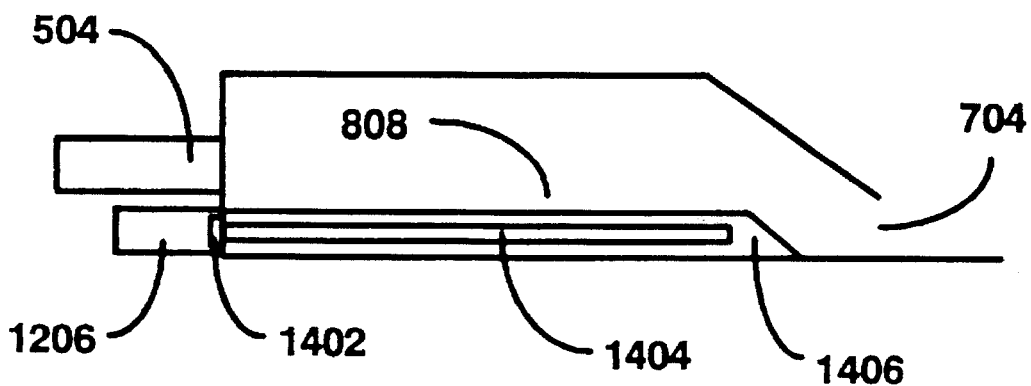

FIGS. 14A and 14B show another embodiment which uses an air cushion in place of the wheel or tractor drives illustrated above. In this embodiment, air is pumped under pressure through air input port 1402 and distributed in lower chamber 1406 by conduit 1404.

While the invention has been described with respect to a preferred embodiment thereof, it will be understood by those skilled in the art that various changes in detail my be made therein without departing from the spirit, scope, and teaching of the invention. For example, the fluidization mechanism may vary, drive mechanisms and steering control mechanisms can vary, size and types of power sources can vary, and the discharge mechanism can be operated both inside the container or remotely by an operator outside the container. Accordingly, the invention herein disclosed is to be limited only as specified in the following claims.

I claim:

1. A mobile cargo discharge system for use with a container, comprising:

a housing assembly, the housing assembly further comprising:
a forward wall;
an input aperture in the forward wall for inputting cargo;
a fluidizer to enhance cargo fluidic motion during discharge, the fluidizer further comprising:
pump means to generate a flow of air;
an air conduit connected at a first end to the output of the pump means and connected at a second end to a fluidizer panel, the air conduit means directing a flow of air from the pump means to the fluidizer panel; and
the fluidizer panel located in or on the forward wall of the housing assembly, the fluidizer panel having a plurality of apertures of a size such that the air delivered to the fluidizer panel by the pump means is ejected through the apertures a velocity sufficient to disturb the cargo on the external wall of the fluidizer panel;
a discharge port for outputting cargo;

a conduit to provide a path for cargo discharged from the discharge port;

means for pneumatically levitating the housing assembly; and suction means to pull cargo into the input aperture, through the housing assembly, and then through the discharge port.

2. A system, as in claim 1, wherein:

a rear wall of the housing assembly is formed such that cargo moving through the housing assembly is guided to the discharge port; and the front wall of the housing assembly is at least partially sloped to guide the fluidized cargo to the input aperture.

3. A method of unloading cargo from a container with a mobile cargo discharge system including the steps of:

locating a fluidizer panel having a plurality of apertures on the forward wall of a housing assembly, pneumatically levitating the housing assembly above the floor of a container;

pumping air into the fluidizer panel;

fluidizing the cargo with a fluidizer panel by ejecting air through the apertures at a velocity sufficient to disturb the cargo on the external wall of the fluidizer panel;

inputting cargo through an aperture in a forward wall of the housing assembly while the housing assembly moves across the floor of the container;

discharging the inputted cargo through a discharge port in the housing assembly into a conduit;

pulling the cargo discharged by the housing assembly through the conduit under pressure.

\* \* \* \* \*